United States Patent
Lavi et al.

(10) Patent No.: US 12,023,852 B2
(45) Date of Patent: Jul. 2, 2024

(54) DEVICE AND METHOD FOR ADDITIVE CASTING OF METALLIC PARTS

(71) Applicant: MAGNUS METAL LTD., Tzora (IL)

(72) Inventors: Gil Lavi, Ness-Ziona (IL); Boaz Vinogradov, Rehovot (IL)

(73) Assignee: MAGNUS METAL LTD., Tzora (IL)

( * ) Notice: Subject to any disclaimer, the term of this patent is extended or adjusted under 35 U.S.C. 154(b) by 0 days.

(21) Appl. No.: 17/842,593

(22) Filed: Jun. 16, 2022

(65) Prior Publication Data

US 2022/0305550 A1 Sep. 29, 2022

Related U.S. Application Data (63) Continuation of application No. 17/519,443, filed on Nov. 4, 2021, which is a continuation of application
(Continued)

(51) Int. Cl.
*B33Y 10/00* (2015.01)
*B22D 23/00* (2006.01)
(Continued)

(52) U.S. Cl.
CPC ............ *B29C 64/106* (2017.08); *B22D 23/00* (2013.01); *B22F 10/22* (2021.01); *B22F 10/364* (2021.01);
(Continued)

(58) Field of Classification Search
CPC .............................. B33Y 30/00; B33Y 10/00
See application file for complete search history.

(56) References Cited

U.S. PATENT DOCUMENTS

| 5,207,371 A | 5/1993 | Prinz et al. |
| 5,216,616 A | 6/1993 | Masters |
| (Continued) | | |

FOREIGN PATENT DOCUMENTS

| CN | 101449295 A | 6/2009 |
| CN | 204136193 U | 2/2015 |
| (Continued) | | |

OTHER PUBLICATIONS

Merz, R. et al., "Shape Deposition Manufacturing," Dissertation, International Solid Freeform Fabrication Symposium, May 16, 1994, 189 pages.
(Continued)

*Primary Examiner* — Kevin E Yoon
(74) *Attorney, Agent, or Firm* — Kilpatrick Townsend & Stockton LLP (57) ABSTRACT

A method and an apparatus for additive casting of parts is disclosed. The method may include: depositing, on a build table, a first portion of a mold, such that, the depositing may be performed layer by layer; pouring liquid substance into the first portion of the mold to form a first casted layer; solidifying at least a portion of the first casted layer; depositing a second portion of the mold, on top of the first portion of the mold; pouring the liquid substance into the second portion of the mold to form a second casted layer, on top of at least a portion of the first casted layer; and solidifying at least a portion of the second casted layer. The method may further include joining the first and second casted layers prior to the pouring of a third casted layer.

20 Claims, 5 Drawing Sheets

Related U.S. Application Data

No. 16/816,373, filed on Mar. 12, 2020, which is a continuation-in-part of application No. PCT/IL2018/051006, filed on Sep. 6, 2018.

(60) Provisional application No. 62/557,167, filed on Sep. 12, 2017.

(51) Int. Cl.
| | |
|---|---|
| *B22F 10/22* | (2021.01) |
| *B22F 10/364* | (2021.01) |
| *B22F 10/38* | (2021.01) |
| *B22F 10/50* | (2021.01) |
| *B22F 10/64* | (2021.01) |
| *B22F 10/80* | (2021.01) |
| *B22F 10/85* | (2021.01) |
| *B22F 12/00* | (2021.01) |
| *B22F 12/13* | (2021.01) |
| *B22F 12/53* | (2021.01) |
| *B22F 12/55* | (2021.01) |
| *B22F 12/58* | (2021.01) |
| *B29C 64/106* | (2017.01) |
| *B29C 64/124* | (2017.01) |
| *B29C 64/268* | (2017.01) |
| *B33Y 30/00* | (2015.01) |
| *B22F 10/47* | (2021.01) |
| *B33Y 40/20* | (2020.01) |
| *B33Y 70/10* | (2020.01) |

(52) U.S. Cl.
CPC .............. *B22F 10/38* (2021.01); *B22F 10/50* (2021.01); *B22F 10/64* (2021.01); *B22F 10/80* (2021.01); *B22F 10/85* (2021.01); *B22F 12/13* (2021.01); *B22F 12/22* (2021.01); *B22F 12/53* (2021.01); *B22F 12/55* (2021.01); *B22F 12/58* (2021.01); *B29C 64/124* (2017.08); *B29C 64/268* (2017.08); *B22F 10/47* (2021.01); *B33Y 10/00* (2014.12); *B33Y 30/00* (2014.12); *B33Y 40/20* (2020.01); *B33Y 70/10* (2020.01)

(56) References Cited

U.S. PATENT DOCUMENTS

| | | | |
|---|---|---|---|
| 5,281,789 | A | 1/1994 | Merz et al. |
| 5,286,573 | A | 2/1994 | Prinz et al. |
| 5,301,415 | A | 4/1994 | Prinz et al. |
| 5,301,863 | A | 4/1994 | Prinz et al. |
| 5,398,193 | A | 3/1995 | deAngelis |
| 9,435,211 | B2 | 9/2016 | Xu |
| 9,440,397 | B1 | 9/2016 | Fly |
| 2013/0025810 | A1 | 1/2013 | Castle et al. |
| 2014/0163717 | A1 | 6/2014 | Das et al. |
| 2015/0003995 | A1 | 1/2015 | Xu |
| 2015/0144284 | A1 | 5/2015 | Snyder et al. |
| 2015/0190964 | A1 | 7/2015 | Okamoto |
| 2015/0328681 | A1 | 11/2015 | Bullied et al. |
| 2016/0243619 | A1 | 8/2016 | Gothait et al. |
| 2016/0325541 | A1 | 11/2016 | Lavrentyev et al. |
| 2016/0346831 | A1 | 12/2016 | Snyder et al. |
| 2016/0368046 | A1 | 12/2016 | Collins et al. |
| 2017/0036394 | A1 | 2/2017 | Schmehl |
| 2017/0087632 | A1 | 3/2017 | Mark |
| 2018/0071819 | A1* | 3/2018 | Connor ................ B22F 3/1035 |
| 2018/0304540 | A1 | 10/2018 | Tobia et al. |
| 2019/0319291 | A1 | 10/2019 | Cook et al. |
| 2020/0206810 | A1 | 7/2020 | Lavi et al. |
| 2020/0215810 | A1* | 7/2020 | Sutcliffe ................ B22F 10/28 |
| 2022/0024075 | A1* | 1/2022 | Martin ................... B33Y 10/00 |
| 2022/0055102 | A1 | 2/2022 | Lavi et al. |

FOREIGN PATENT DOCUMENTS

| | | | |
|---|---|---|---|
| CN | 106626369 | A | 5/2017 |
| JP | H10-226803 | A | 8/1998 |
| JP | 2016-534902 | A | 11/2016 |
| KR | 20170040060 | A | 4/2017 |
| WO | 97/09141 | A1 | 3/1997 |
| WO | 2006/078342 | A2 | 7/2006 |

OTHER PUBLICATIONS

Merz, R. et al., "Shape Deposition Manufacturing," The Robotics Institute and The Engineering Design Research Center Carnegie Mellon University, Conference Paper, Proceedings of Solid Freeform Fabrication Symposium, Aug. 1994, 8 pages.

Prinz, M. R. et al, "Shape Deposition Manufacturing," The Robotics Institute and The Engineering Design Research Center Carnegie Mellon University, 1994, 8 pages.

Weiss, L. et al., "Shape Deposition Manufacturing of Wearable Computers," International Solid Freeform Fabrication Symposium, 1996, pp. 31-38.

"Additive Manufacturing New metal technologies," Ampower Insights, vol. 6, Mar. 2020, 48 pages, downloaded Nov. 4, 2020 from https://tritoneam.com/wp-content/uploads/Ampower-Insights-vol.6-New-Technologies-1.pdf.

Extended European Search Report for Application No. 18856305.0-1103, dated Jul. 5, 2021, 12 pages.

Amon, C. H., et al., "Shape Deposition Manufacturing With Microcasting: Processing, Thermal and Mechanical Issues," Transactions of the American Society of Mechanical Engineers, Series B: Journal of Engineering for Industry, ASME, vol. 120, No. 3, Aug. 1, 1998, pp. 656-665.

International Search Report and Written Opinion for Application No. PCT/IL2018/051006, dated Jan. 2, 2019, 17 pages.

U.S. Appl. No. 16/816,373 Restriction Requirement dated Jun. 29, 2020, 6 pages.

U.S. Appl. No. 16/816,373 Non-Final Office Action dated Aug. 24, 2020, 11 pages.

U.S. Appl. No. 16/816,373 Final Office Action dated Jan. 22, 2021, 13 pages.

U.S. Appl. No. 16/816,373 Non-Final Office Action dated Apr. 30, 2021, 15 pages.

U.S. Appl. No. 16/816,373 Final Office Action dated Nov. 15, 2021, 12 pages.

U.S. Appl. No. 16/816,373 Non-Final Office Action dated Jun. 3, 2022, 12 pages.

U.S. Appl. No. 16/816,373 Final Office Action dated Sep. 14, 2022, 14 pages.

U.S. Appl. No. 17/519,443 Non-Final Office Action dated Aug. 7, 2023, 14 pages.

U.S. Appl. No. 17/519,443 Final Office Action mailed Feb. 29, 2024, 13 pages.

* cited by examiner

DEVICE AND METHOD FOR ADDITIVE CASTING OF METALLIC PARTS

CROSS-REFERENCE TO RELATED APPLICATIONS

This application is a Continuation of commonly owned U.S. patent application Ser. No. 17/519,443, filed Nov. 4, 2021, which is a Continuation of commonly owned U.S. patent application Ser. No. 16/816,373, filed Mar. 12, 2020, which is a Continuation in Part application of commonly owned PCT International Application No. PCT/IL2018/051006, International Filing Date Sep. 6, 2018, claiming the benefit of U.S. Patent Application No. 62/557,167, filed Sep. 12, 2017, which are hereby incorporated by reference.

TECHNICAL FIELD OF THE INVENTION

The application generally relates to the field of casting parts. More specifically the application relates to the field of additive casting of parts.

BACKGROUND OF THE INVENTION

Casting is one of the oldest material-forming methods still used today. The idea of pouring liquid material into a mold which contains a hollow cavity of the desired shape and then allowed it to solidify is 6000 years old. The principal process has not changed since 3200 BC when bronze was melted and poured into a stone mold. When glass was invented around 3000 years ago, glass was also casted in molds (in addition to the glass blowing process) in order to form articles made from glass. In modern days, polymer resins are also casted into molds in order to form shaped polymeric parts.

Modern casting methods involve the use of molds made from various materials, such as sand casting, die casting (e.g., a metallic mold), semi-die casting (e.g., metallic mold and sand inserts), investment casting (e.g., a ceramic shell mold), lost foam casting (e.g., relapsing polymeric foam with molten metal placed in a sand container) and the like. However, the idea of pouring all the required amount of metal in order to form a desired object/part at a single pouring act has not changed.

Casting, although being a very reliable method, is also very expensive, time consuming, and is adapted for large production quantities. The time required in order to form the molds of die casting or make a mold for sand casting molds is typically several months. Furthermore, even the most modern casting methods are not flexible to changes. Every little change to the mold makes the process more expensive and delays the production time.

Printing three-dimensional (3D) objects is one of the newest material-forming methods. Inks made from polymer resins, metallic powders mixed with binders or ceramic powders mixed with binders are printed on a build table, sometimes with the addition of a printed shell/support structure to support the printed object. A 3D computerized model is used to create the printed object. Accordingly, any change in the 3D model is easily implemented without the need to change any of the printing parameters. However, the quality of the printed part, (for example, mechanical properties, material defects, voids and dislocations) in particular metal printed parts that further require heat treatment processes are often inferior to the quality of casted parts.

Currently used processes for three-dimensional printing of metal objects includes deposition of metal powder/particles, layer by layer, followed by a selective laser sintering (SLS) to melt/solidify the fine deposited layer. Another process includes printing a wax pattern of the mold by a three-dimensional printer, for subsequent use in an investment casting to fabricate a metal object. However, because the three-dimensional printing results are the fabrication of the mold rather than the finished metal object itself, additional stages of gravitational casting are required in order to finish the metal object.

Therefore, there is a need for a system and a method that obviate the disadvantages of the above production methods.

SUMMARY OF THE INVENTION

Some aspects of the invention may be directed to a method of additive casting of parts. In some embodiments, the method may include: depositing, on a build table, a first portion of a mold, such that, the depositing is performed layer by layer; pouring liquid substance into the first portion of the mold to form a first casted layer; solidifying at least a portion of the first casted layer; depositing a second portion of the mold, on top of the first portion of the mold; pouring the liquid substance into the second portion of the mold to form a second casted layer, on top of at least a portion of the first casted layer; and solidifying at least a portion of the second casted layer.

In some embodiments, the method may further include receiving a three-dimensional (3D) part model including one or more parts, the part model is divided into a plurality of casted layers. In some embodiments, the method may further include receiving a 3D mold model, the mold model is divided into a plurality of mold portions, wherein the mold model is designed to provide a desired shape to the liquid substance. In some embodiments, the method may further include generating a 3D mold model based on the received part model, the mold model is divided into a plurality of mold portions, wherein the mold model is designed to provide a designed shape to a liquid substance.

In some embodiments, the liquid substance is one of: a molten metal, a molten glass and a polymer resin. In some embodiments, the method may further include joining the first and second casted layers prior to the pouring of a third casted layer. In some embodiments, joining may include melting at least a portion of the interface between the first and second casted layers. In some embodiments, joining may include treating at least a portion of an upper surface of the second casted layer with at least one of: an induction heater, a resistance welder, an ultrasonic welder, plasma deposition unit, E-beam, a laser, a welding arc, a torch, cold fusion and magnetic field flow. In some embodiments, joining may include at least one of: gluing, ultrasonic bonding, diffusion bonding, heat curing and ultraviolet (UV) curing.

In some embodiments, the method may further include pre-heating each casted layer prior to the pouring of an additional casted layer. In some embodiments, the method may further include providing surface treatment to each casted layer after solidification and prior to the pouring of an additional casted layer. In some embodiments, the surface treatment may include at least one of: machining, grinding, polishing and laser ablation. In some embodiments, the method may further include: providing surface treatment to internal walls of each mold portion prior to the pouring of the corresponding casted layer. In some embodiments, the surface treatment to internal walls of each mold portion may include machining the internal walls and removing the excess material.

In some embodiments, the method may further include leveling the first casted layer and the first mold portion to be in the same level prior to the deposition of the second mold portion. In some embodiments, the depositing and pouring steps are performed under a protective atmosphere. In some embodiments, the first and second casting layers have different thicknesses. In some embodiments, the first and second casted layers have thickness of between 0.1-12 mm. In some embodiments, each mold layer may include a mixture of granular material and a binder, wherein the granular material may include at least one of: ceramic powders, sand, clay, and any combination thereof. In some embodiments, the mixture may further include metallic powder.

In some embodiments, depositing the one or more mold layers may include printing each mold layer using a 3D printer. In some embodiments, pouring the liquid substance is from a movable pouring unit including at least one liquid introduction port for pouring liquid substance. In some embodiments, the movable pouring unit may be configured to pour a predetermined amount of liquid substance at predetermined locations in each mold portion. In some embodiments, the method may further include annealing the solidified first casted layer by pouring molten metal to form a third and a fourth casted layers. In some embodiments, the first casted layer is casted by pouring a first liquid substance having a first chemical composition; and the second casted layer is casted by pouring a second liquid substance having a second chemical composition. In some embodiments, the first liquid substance and the second liquid substance may be selected from: two alloys of the same metallic element, two types of glass and two types of polymers.

In some embodiments, the first liquid substance and the second liquid substance differ in at least one of: the amount and the type of additives, wherein the additives are configured to at least: evaporate and decompose during casting. In some embodiments, the method may further include: measuring a chemical composition of the liquid substance in the first container prior to pouring the liquid substance into at least one of: the first mold portion and the second mold portion; measuring the chemical composition of the corresponding casted layer; and comparing the measurements. In some embodiments, the method may further include: removing the corresponding casted layer, if the measurements yield a difference in chemical composition larger than a threshold value; and pouring new liquid substance into the at least one of: the first mold portion and the second mold portion.

In some embodiments, pouring the liquid substance into the second mold portion may be in an amount sufficient to form the second casted layer and to compensate for at least one of: shrinkage of the first casted layer and thickness deviation in the first casted layer.

Some aspects of the invention may be related to an additive casting apparatus. An additive casting apparatus according to embodiments of the invention may include: a movable dispensing unit in fluid connection with a first container containing mold material, the dispensing unit including one or more liquid introduction ports for depositing the mold material; a movable pouring unit in fluid connection with at least one second container for holding liquid substance, the pouring unit including one or more liquid introduction ports for pouring at least one liquid substance; a build table for holding the deposited mold material and the poured liquid substance; and a controller configured to: control the movable dispensing unit to deposit a first portion of a mold, layer by layer; control the movable pouring unit to pour at least one liquid substance into the first portion of the mold to form a first casted layer; control the movable dispensing unit to deposit a first portion of a mold, layer by layer, on top of the first portion; and control the movable pouring unit to pour the at least one liquid substance into the second portion of the mold to form a second casted layer on top of at least a portion of the first casted layer.

In some embodiments, the additive casting apparatus may further include a joining unit configured to join the first and second casted layers prior to a deposition of a third mold portion and the pouring of a third casted layer. In some embodiments, the joining unit may be at least one of: an induction heater, E-beam, a resistance welder, an arc welder, a laser welder, a torch, a gluing device, a cold fusion unit, a magnet for magnetic field flow, an ultrasonic bonding unit and a heater for diffusion bonding. In some embodiments, the at least one second container may be a crucible and the liquid substance is one of: a molten metal and molten glass. In some embodiments, the at least one second container may be a tank and the liquid substance is at least one of: a polymer resin or a molten polymer.

In some embodiments, the additive casting apparatus may further include a pre-heating unit for heating each casted layer prior to pouring an additional casted layer. In some embodiments, the additive casting apparatus may further include one or more surface treatment units for treating the surface of each casted layer after the solidification and prior to pouring an additional casted layer. In some embodiments, the one or more surface treatment units includes at least one of: a machining device, a grinding device and a polishing device.

In some embodiments, the additive casting apparatus may further include an enclosure filled with protective atmosphere for providing the protective atmosphere to the casted layers during casting. In some embodiments, the enclosure may include a closed housing accommodating: the movable dispensing unit, the movable casting unit, the build table and a device configured to provide the protective atmosphere. In some embodiments, the controller may further be configured to: receive a three-dimensional (3D) part model of one or more solid parts, the 3D part model is divided into a plurality of casted layers; receive a 3D mold model of a mold, the mold model is divided into a plurality of mold portions, wherein the mold is designed to provide a desired shape to a liquid substance; control the deposition of the mold portions based on the mold model; and control the pouring of the casted layers based on the part model.

In some embodiments, the movable despising unit is configured to move in at least one axis. In some embodiments, the movable pouring unit is configured to move in at least one axis. In some embodiments, the additive casting apparatus may further include the build table and may be coupled to a movable platform. In some embodiments, the movable pouring unit may be in fluid connection with two containers for holding a first liquid substances and a second liquid substances, and the controller may be configured to: control the movable pouring unit to pour the first liquid substance into the first portion of the mold to form a first casted layer; and control the movable pouring unit to pour the second liquid substance into the second portion of the mold to form a second casted layer.

In some embodiments, the additive casting apparatus may further include at least one chemical composition sensor configured the measure at least of: the chemical composition of the liquid substance in the container and the chemical composition of the casted layers. In some embodiments, the at least one substance composition sensor based on X-ray or laser.

Some additional aspects of the invention may be directed to a casted metallic part that may include: at least a first casted layer including a first type of alloy; at least a second casted layer including a second type of alloy, joined to the at least first casted layer. In some embodiments, the first and second alloys are different alloys of the same metallic element. In some embodiments, the thickness of each casted layer may be at least two orders of magnitude smaller than the perimeter of each casted layer. In some embodiments, the casted metallic may further include a third casted layer joined to at least one second casted layer. In some embodiments, the third casted layer may include a third type of alloy of the same metallic element. In some embodiments, the at least a first casted layer may differ from the at least a second casted layer also in microstructure.

Some additional aspects of the invention may be directed to a casted metallic part that may include: at least a first casted layer having a first predetermined microstructure; and at least a second casted layer having a second predetermined microstructure, joined to the at least first casted layer. In some embodiments, the first and second predetermined microstructures may differ at least in the average grain size. In some embodiments, the thickness of each casted layer may be at least two orders of magnitude smaller than the perimeter of each casted layer. In some embodiments, the casted metallic may further include a third casted layer joined to at least one second casted layer. In some embodiments, the third casted layer having a third predetermined microstructure.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A casting apparatus and method according to embodiments of the invention may include producing casted parts layer by layer, by pouring liquid medium (e.g., a molten metal/alloy, molten glass, a polymer resin, etc.) into mold portions being deposited themselves layer by layer. The liquid medium may be any liquid material that can solidify when poured into a mold, either spontaneously (e.g., solidification of molten martials due to cool down) or assisted by an additional process (e.g., polymerization/crosslinking of monomers or a polymer precursor using heat or ultraviolet (UV) curing).

As used herein, a mold (also known in the art as a shell) may include any hollow cavity configured to provide a shape to the liquid material being poured into the mold and allowed to solidify. A mold according to embodiments of the invention may be manufactured by printing/depositing layer by layer of mold material to form different mold portions, as disclosed herein. As used herein, a mold material may be any material suitable for being deposited/printed from a deposition unit and provide a shape for a specific liquid material being poured into the mold, after the mold deposition. For example, when the liquid material is a molten polymer or a polymer resin the mold material may also include a polymer. In another example, when the liquid material is molten metal (e.g., having a melting temperature of above 500° C.) or molten glass (e.g., having a melting temperature of above 1000° C.) the mold material may include granular material mixed with a binder and configured to hold molten substance at elevated temperatures. The granular material may include: ceramic powders (e.g., zirconia, alumina, magnesia, etc.), sand, clay, metallic powders and any combination thereof. In some embodiments, the mold material may further include activation additives. For example, UV absorbing particles, crosslinking agents, heat absorbing particles and the like.

In order to ensure the bonding between consecutive casted layers a joining process may be conducted, using any joining method known in the art. The joining method may be selected according to the casted material, for example, two metallic layers may be welded, two glass layers may be diffusion bonded and two polymeric layers may be glued and/or crosslinked.

Figure 1:
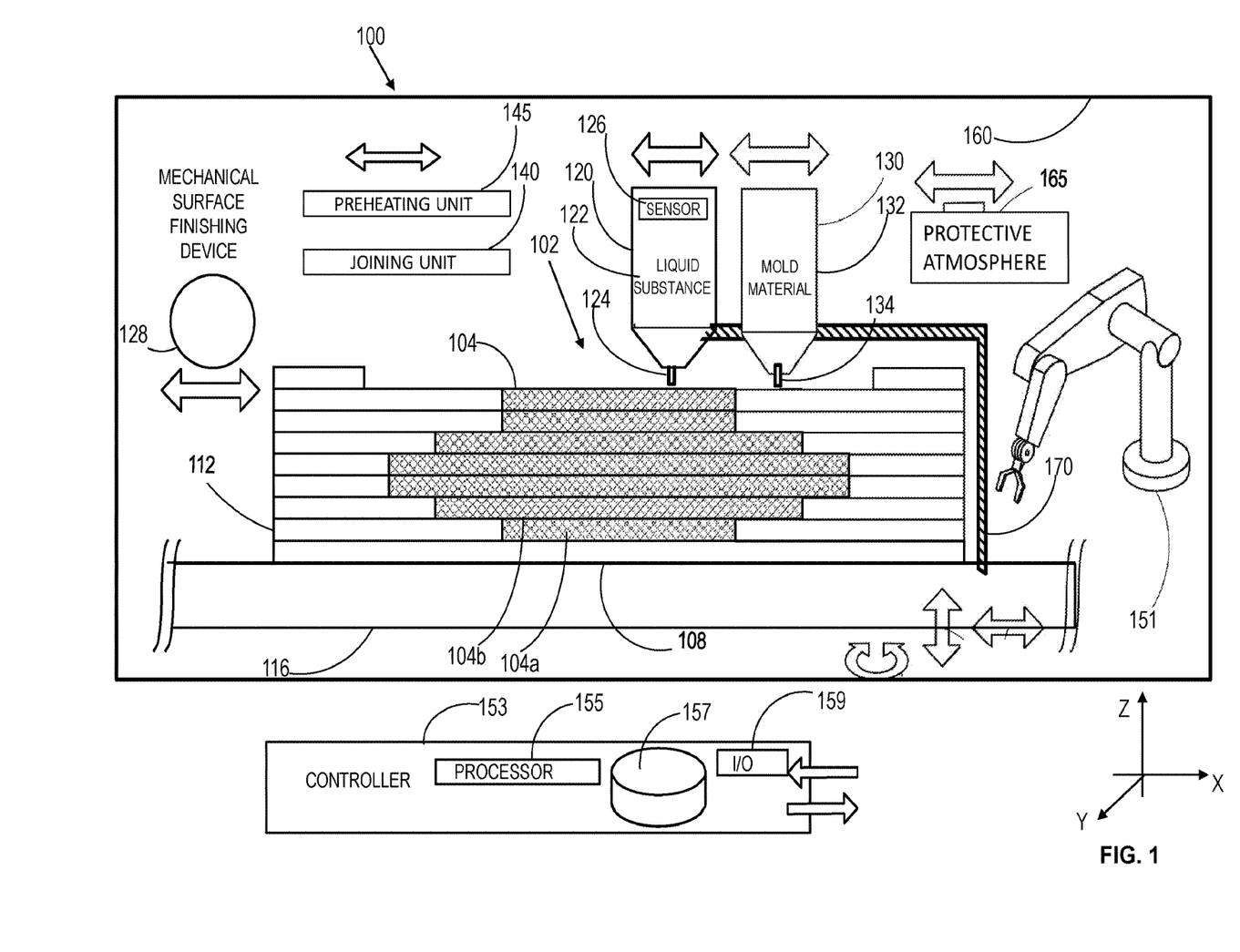
FIG. 1 is an illustration of an additive casting apparatus according to some embodiments of the invention.

Reference is now made to FIG. 1 which is an illustration of an additive casting apparatus according to some embodiments of the invention. Such an additive casting apparatus may allow depositing a plurality of mold portions substantially one on top of the other that may form a single mold for casting liquid medium. Each mold portion, as deposited, may be filled with liquid substance in order to form a casted layer, prior to the deposition of an additional mold portion. Thus, forming casted part(s) made from a plurality of casted layers, being casted one on top of the other. Depositing, each mold portion may include depositing one or more layers of mold material.

An additive casting apparatus 100 may include a movable dispensing unit 130 for depositing the mold material and a movable pouring unit 120 for pouring at least one liquid substance. Additive casting apparatus 100 may further include a build table 116 for holding the deposited mold material and the poured liquid substance and a controller 153 configured to control the controllable components of apparatus 100. In some embodiments, additive casting apparatus 100 may further include a fixed frame 170 for holding at least some of the movable elements of additive casting apparatus 100. Fixed frame 170 may be stationary.

In some embodiments, movable dispensing unit 130 may include one or more liquid introduction ports 134 (e.g., nozzles, spouts and the like) for pouring at least one liquid substance. In some embodiments, movable dispensing unit 130 may be in fluid connection and/or may include with at least one first container 132 containing the mold material. In some embodiments, first container 132 may be any tank/cartridge/magazine configured to hold the mold material. In some embodiments, first container 132 may include a stirrer for stirring the mold material in first container 132 prior to the deposition.

In some embodiments, movable dispensing unit 130 may further include a controllable valve configured to control the amount of mold material being poured to form each mold layer in each mold portion 112 from one or more liquid introduction ports 134. In some embodiments, movable dispensing unit 130 may be configured to move in at least one axis (e.g., the X axis as illustrated), for example, when build table 116 may be coupled to a movable platform configured to move in the at least two other axes (e.g., the Y and Z axes). In some embodiments, movable dispensing unit 130 may be configured to move in two or three axes. In some embodiments, movable dispensing unit 130 may be mounted on an X-Y table configured to move movable dispensing unit 130 to any point over build table 116. In some embodiments, build table 116 and movable dispensing unit 130 may be mounted on fixed frame 170 and may each be allowed to relatively move in at least one axis with respect to fixed frame 170. In some embodiments, movable dispensing unit 130 may be controlled (e.g., by controller 153) to deposit mold portions 112 (e.g., first, second, third, fourth, etc. portions) layer by layer.

In some embodiments, movable pouring unit 120 may include one or more liquid introduction ports 124 for pouring at least one liquid substance into a respective mold portion 112. Movable pouring unit 120 may be in fluid connection with at least one second container 122 for holding liquid substance. In some embodiments, when the liquid substance is one of: a molten metal, molten alloy and molten glass at least one second container 122 may be a crucible. The crucible may be made from any material that withstands elevated temperatures. The crucible may include an opening for receiving the molten metal or molten glass (melted in a melting crucible) and at least one exit for providing the melted metal or glass to pouring unit 120. In some embodiments, the crucible may be included in pouring unit 120.

In some embodiments, when the liquid substance is at least one of: a polymer resin or a molten polymer, container 124 may be a tank (e.g., a metallic tank) for holding the polymer resin or the molten polymer. In some embodiments, the tank may include a stirrer (not shown) for stirring the polymer resin. In some embodiments, the tank may be included in pouring unit 120.

In some embodiments, movable pouring unit 120 may be in fluid connection with two or more containers for holding a first liquid substances and a second liquid substances. In some embodiments, the first liquid substances may have a first chemical composition and the second liquid substances may have a second chemical composition, for example, the first liquid substance and the second liquid substance may be selected from: two alloys of the same metallic element, two types of glass and two types of polymers.

In some embodiments, movable pouring unit 120 may further include a controllable valve configured to control the amount of liquid substance poured to form each casted layer 104 from one or more liquid introduction ports 124. In some embodiments, movable pouring unit 120 may be configured to move in at least one axis parallel to the surface of build table 116 (e.g., the X axis illustrated), for example, when build table 116 may be coupled to a movable platform and configured to move in the at least two other axes (e.g., the Y and Z axes). In some embodiments, movable pouring unit 120 may be configured to move in two or three axes. In some embodiments, movable pouring unit 120 may be mounted on an X-Y table configured to move movable pouring unit 120 to any point over build table 116. In some embodiments, build table 116 and movable pouring unit 120 may be mounted on fixed frame 170 and may each be allowed to move in at least one axis with respect to fixed frame 170. In some embodiments, movable pouring unit 120 may be controlled (e.g., by controller 153) to pour each casted layer 104 into a corresponding mold portion (e.g., first, second, third, fourth, etc., portions).

As used herein, a casted layer is a layer made from a liquid substance poured into a mold portion and solidify into a solid casted layer in the mold portion. The casted layer may receive its shape from the shape of the mold portion. The casted layer may include, a casted polymer, casted metal/alloy, casted glass and the like. A casted layer according to some embodiments of the invention may be casted (e.g., poured) on top of a build table, a mold layer, or a previously casted layer, as illustrated in FIG. 1 and discussed with respect to the method of FIG. 2. In some embodiments, the thickness of a typical casted layer may be at least two orders of magnitude smaller than the perimeter of each casted layer. A plurality of solidified casted layers 104 one on top of the other may form a casted part 102.

In some embodiments, additive casting apparatus 100 may further include at least one sensor 126 for measuring a chemical composition of the liquid substance in first container 122 and/or measuring the chemical composition of casted layer 104. At least one sensor 126 may be coupled to movable pouring unit 120. In some embodiments, a single sensor 126 may be assembled such that the sensor may measure both the chemical composition in first container 122 and each casted layer 104. In some embodiments, one or more sensors 126 may include an X-Ray based sensor or a laser-based sensor. It should be appreciated that any other sensor capable of measuring chemical composition of casted layer 104 may be used.

In some embodiments, additive casting apparatus 100 may further include a joining unit 140 configured to join first and second casted layers 104 prior to a deposition of a third mold portion 112 and the pouring of a third casted layer 104. In some embodiments, in order to form a solid part, consecutive casted layers 104 must be joined together. In some embodiments, joining unit 140 may be one of: an induction heater, a resistance welder, an arc welder, a E-beam unit, an ultrasonic welder, a plasma deposition unit, a laser welder, a torch, a gluing device, a cold fusion unit, a magnet for magnetic field flow, an ultrasonic bonding unit, a heater for diffusion bonding and the like. In some embodiments, the type and number of joining devices 140 may be selected according to the type of liquid substance being poured. Joining unit 140 may be configured to move in at least one axis (e.g., the X axis illustrated). For example, joining unit 140 may be carried/coupled to robotic arm 151 capable of moving joining unit 140 to any required point over the surface a casted layer 104. In another example, joining unit 140 may be coupled to a movable X-Y table.

In some embodiments, additive casting apparatus 100 may further include a pre-heating unit 145 for heating each casted layer 104 prior to pouring an additional casted layer 104. In some embodiments, when the casted liquid substance is molten metals, alloys or glass, in order to reduce the temperature gradient between the already solidified casted layer and the molten material being poured to form the additional casted layer, the solidified casted layer may be pre-heated, for example, by an indication heater, or any other suitable heating element (e.g., filament). Pre-heating unit 145 may be configured to move in at least one axis (e.g., the X axis as illustrated). For example, Pre-heating unit 145 may be carried/coupled to robotic arm 151 capable of moving pre-heating unit 145 to any required point over the surface of a casted layer, such as layer 104. In another example, pre-heating unit 145 may be coupled to a movable X-Y table. In some embodiments, a movable pre-heating unit 145 may be may be configured to move with respect to fixed arm 170.

In some embodiments, additive casting apparatus 100 may further include one or more surface treatment units 128. The one or more surface treatment units may include at least one of: a machining device, a grinding device, a polishing device, a laser ablation unit, and the like. For example, the machining device may be included any cutting tool configured to at least one of: mill, drill, broach, saw and the like. In some embodiments, the machining device may be a computer numerical control (CNC) controlling a plurality of cutting tools. In some embodiments, surface treatment units 128 may include a grinding machine and/or a polishing machine for receiving fine and ultrafine surface finishing.

In some embodiments, surface treatment units 128 may be configured to treat the surface of each casted layer 104 including both mold and poured material after the solidification and prior to pouring an additional casted layer 104. In some embodiments, surface treatment units 128 may be configured to treat the inner and/or upper surface of each mold portion 112 prior to pouring the corresponding casted layer 104, as illustrated and discussed with respect to FIG. 4. As used herein, the upper surface is the surface parallel to table 116 and inner surface is the surface of the inner walls of the mold portion that may come in contact with the poured liquid substance. In some embodiments, one or more surface treatment units 128 may be configured to machine the upper surface of both the mold portion and the corresponding casted layer, prior to depositing of another casted layer, in order to level and even the height (e.g., thickness) of both the mold portion and the corresponding casted layer. The leveling may ensure an accurate deposition and pouring of the following mold portion and casted layer. One or more surface treatment units 128 may be configured to move in at least one axis (e.g., the X axis as indicated by the illustrated arrows).

In some embodiments, additive casting apparatus 100 may further include a hardening unit (not illustrated) for assisting in the hardening of a polymeric casted layer 104 after pouring, for example, by heating or UV curing.

In some embodiments, additive casting apparatus 100 may further include an enclosure 160 filled with protective atmosphere for providing the protective atmosphere to the casted layers during casting. As used herein a protective atmosphere may include any atmosphere that can protect the surface of the as casted layer 104 from undesirable chemical reactions, such as, oxidation and carbonization. The protective atmosphere may include, an inert gas such as argon, nitrogen and the like. The protective atmosphere may include vacuum. In some embodiments, enclosure 160 may include a closed housing accommodating at least: movable dispensing unit 130, movable casting unit 120, build table 116 and a device 165 configured to provide the protective atmosphere, for example, a vacuum pump, an argon source and the like.

In some embodiments, build table 116 may be or may include a surface configured to hold the deposited mold material and the poured liquid substance. Build table 116 may include any suitable material, for example, metals such as steels, ceramics, such as, alumina and the like. In some embodiments, build table 116 may include more than one type of material (for example, a metal and a ceramic) when the first mold portion 112 is to be deposited on a ceramic surface and the first casted layer 104 is to be poured on a metallic surface.

In some embodiments, build table 116 may be movable and may be configured to move in at least one axis, for example, the three axes indicated by the illustrated arrows. In some embodiments, build table 116 may be configured to rotate around the vertical axis. Build table 116 may be coupled to a movable platform, such as an x-y table and the like.

In some embodiments, controller 153 may include any processing unit, such as, processor 155 configured to execute methods, codes and instructions according to embodiments of the present invention. The methods, codes and instructions may be stored in non-transitory storage 157, for example, instructions to control various controllable components of casting apparatus 100 (e.g., movable dispensing unit 130, movable pouring unit 120, build table 116, joining unit 140, pre-treatment unit 145 and the like). Storage 157 may further include any data related to the operation of casting device 100, for example, 3D models of parts and/or molds. In some embodiments, controller 153 may be configured to: control movable dispensing unit 130 to deposit a first portion of a mold, layer by layer; control movable pouring unit 120 to pour at least one liquid substance into the first portion of the mold to form a first casted layer; control movable dispensing unit 130 to deposit a first portion of a mold, layer by layer, on top of the first portion; and control movable pouring unit 120 to pour the at least one liquid substance into the second portion of the mold to form a second casted layer on top of at least a portion of the first casted layer. In some embodiments, controller 153 may control movable dispensing unit 130 and movable pouring unit 120 to deposit and pour a plurality of mold portions and the corresponding casted layers, as discussed with respect to the methods of FIGS. 2 and 5.

Figure 2:
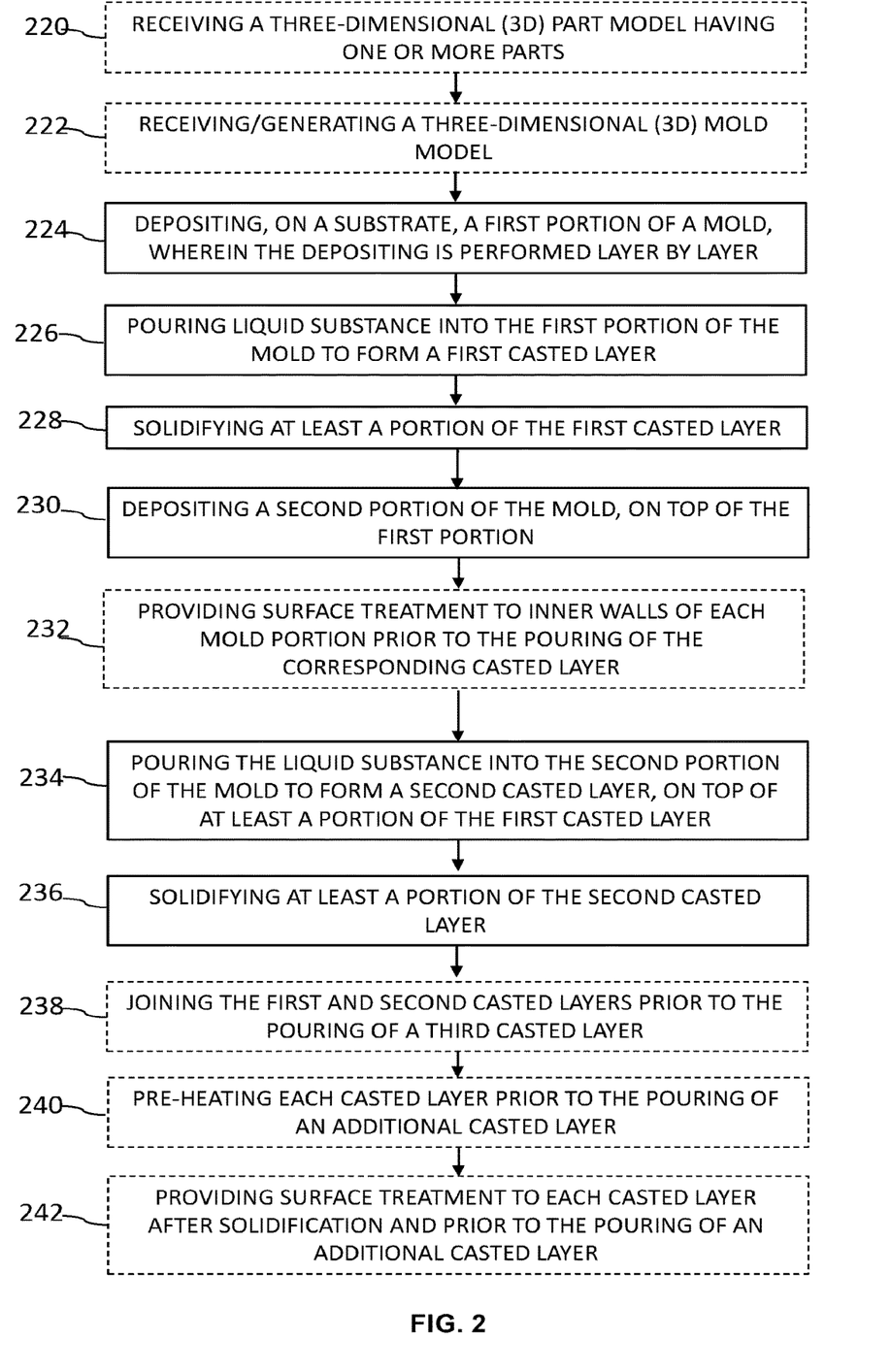
FIG. 2 is a flowchart of a method of additive casting of parts according to some embodiments of the invention.

Reference is now made to FIG. 2 which is a flowchart of a method of additive casting of parts according to some embodiments of the invention. The method of FIG. 2 may be performed by additive casting apparatus 100 under the control of controller 153. In some embodiments, instructions to perform at least some of the steps of the method of FIG. 2 may be stored in storage 157. In some embodiments, a 3D model of one or more parts to be casted may be received, in step 220. The 3D part model may be received by controller 153, via I/O unit 159, for example, from any computer aided design (CAD) software. Controller 153 may then divide the 3D part model into a plurality of casted layers, for example, layers 104, 104a, 104b in FIG. 1 layer 204 in FIGS. 3A and 3B and 304 in FIG. 4.

In some embodiments, a 3D model of the mold may be received, in step 222. The 3D mold model may be received by controller 153, via I/O unit 159, for example, from any computer added design (CAD) software. In some embodiments, the 3D model may be generated, in step 222, based for example, on the 3D part model. Controller 153 may use any software module to generate a 3D mold model designed to provide a desired shape to a liquid substance, as to form the final casted part(s). In some embodiments, the 3D mold model may be divided into a plurality of mold portions (e.g., shells), for example, mold portions 108 and 112 illustrated in FIG. 1, portions 212, 213 and 215 illustrated in FIGS. 3A and 3B and portions 312 and 313 illustrated in FIG. 4. In some embodiments, each mold portion may further be divided into one or more mold layers, such that each mold portion may include one or more (e.g., two or more) deposited mold layers.

In some embodiments, a first portion of a mold may be deposited on a build table, layer by layer, in step 224. For example, first portion 212 illustrated in FIGS. 3A and 3B or first portion 312 illustrated in FIG. 4 may be deposited by movable dispensing unit 130. Controller 153 may control movable dispensing unit 130 to deposit the mold material according to the division of the mold model. In some embodiments, controller 153 may control movable dispensing unit 130 to deposit the mold material in specific locations on build table 116 by controlling one or more liquid introduction ports 134 to drop mold material when movable dispensing unit 130 reaches each of the specific locations. Controller 153 may control at least one of movable dispensing unit 130 and build table 116 to move with respect to one another as to position movable dispensing unit 130 at the specific location. At the end of the deposition, the mold portion may form a shape having closed walls (e.g., a ring, an open box, etc.) configured to accommodate a liquid substance.

Figure 3A:
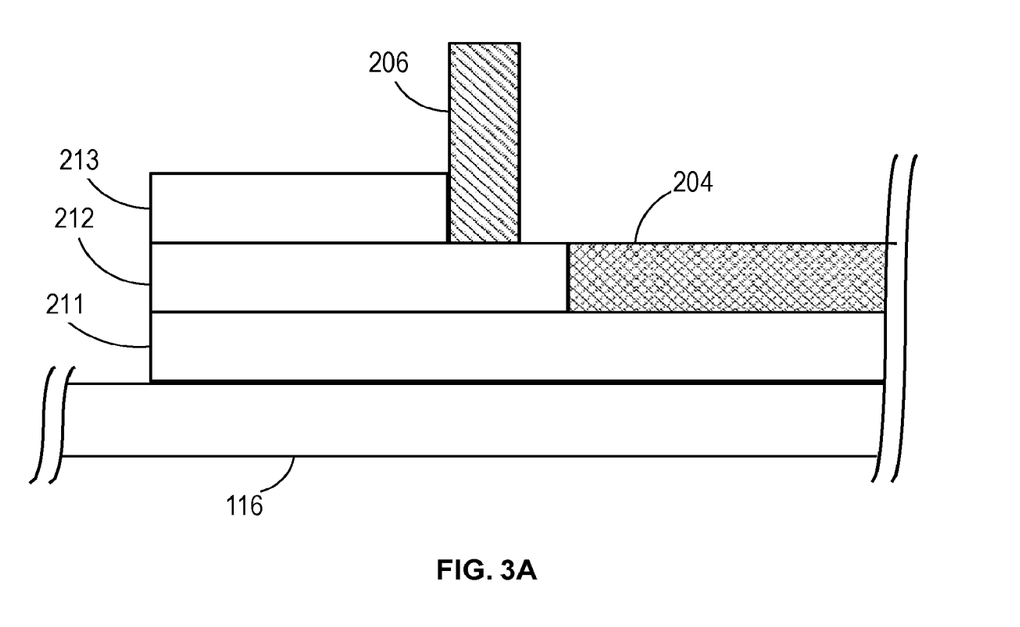
FIGS. 3A and 3B are illustration of an in processes casted part and mold according to some embodiments of the invention.
Figure 3B:
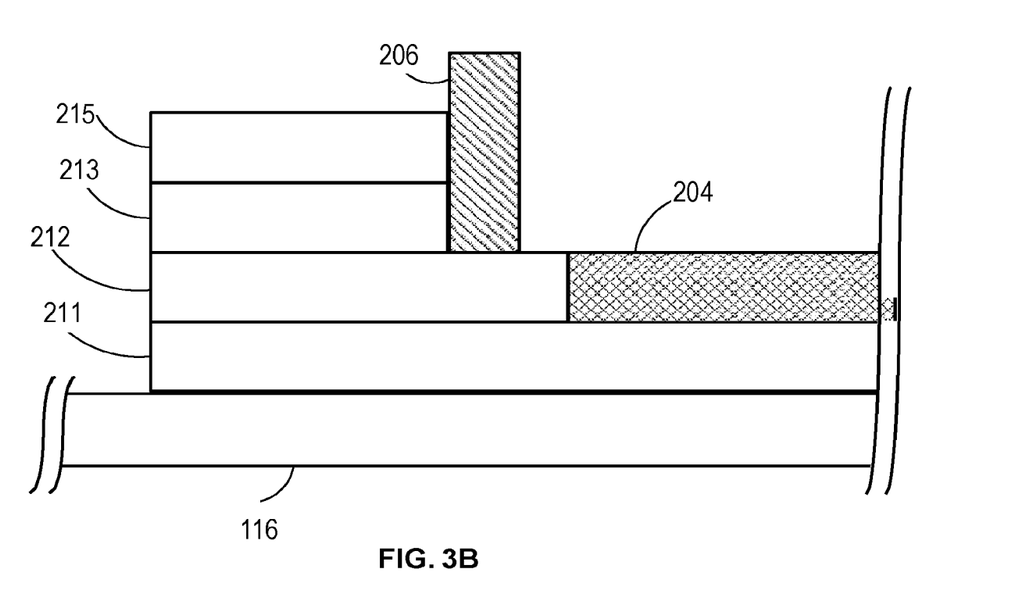

In some embodiments, the method may include depositing an initial mold layer (e.g., portions 108 illustrated in FIG. 1, 211 illustrated in FIGS. 3A and 3B and 311 illustrated in FIG. 3) prior to the deposition of the first mold portion as to have a complete coverage of the build table at the bottom of the first mold portion.

In some embodiments, liquid substance may be poured into the first portion of the mold to form a first casted layer, in step 226. For example, molten metal, molten glass, polymer resin etc. may be poured from movable pouring unit 120 into a volume formed by the walls of mold portion 212 to form casted layer 204, as illustrated in FIGS. 3A and 3B. In some embodiments, movable pouring unit 120 may continuously pour the liquid substance while moving along the surface of build table 116. In some embodiments, the amount of liquid substance being poured may be calculated, by controller 153, according to the volume formed by the walls of mold portion 212 and the expected shrinkage of the liquid substance during the solidification. Controller 153 may control at least one of movable pouring unit 120 and build table 116 to move with respect to one another. In some embodiments, at least a portion of the first casted layer may solidify, is step 228. For example, molten material may be at least partially solidified due to temperature dropping starting, for example, from the mold portions' walls and inwards. In yet another example, polymer resin (e.g., a precursor or a mixture of monomers) may polymerized, cured or crystallized, either spontaneously or with the aid to external energy source, such as UV lamp.

In some embodiments, a second portion of the mold may be deposited, layer by layer, on top of the first portion, in step 230. For example, second mold portion 213 may be deposited on top of first portion 212, according to the divided 3D mold model, as illustrated in FIGS. 3A and 3B. The deposition of second mold portion 213 may be substantially the same as the deposition of first mold portion 212 discussed in step 224. In some embodiments, a third mold portion 215 may be deposited on top of second mold portion 213, as illustrated in FIG. 215.

In some embodiments, the mold material may be deposited, layer by layer, in order to form support structures in the mold. Such a support structure may include one or more elements for overhanging casted layers. For example, at least one mold portions may include one or more protrusions that may form support for casted layers poured above the protrusions.

In some embodiments, the inner walls of each mold portion may undergo surface treatment prior to the pouring of an additional casted layer, in step 232. In some embodiments, the surface treatment may include at least one of: machining, grinding, polishing and the like, for example, by surface treatment unit 128. For example, a 90° mill 206, illustrated in FIGS. 3A and 3B may mill the walls of second mold portion 213 (and third mold portion 215) as to attain a more precise and smooth edge. In yet another example, a slope may be provided to the walls of mold portion 313, illustrated in FIG. 4, by an angled end mill 306. In some embodiments, the excess material machined (e.g., milled) may be removed from the corresponding mold portion, as not to be mixed with the liquid substance to be poured into the mold portion.

In some embodiments, liquid substance may be poured into the second portion of the mold to form a second casted layer, on top of at least a portion of the first casted layer, in step 234. The pouring of the second casted layer may be substantially the same as the pouring of the first casted layer. In some embodiments, the second casted layer may be let to at least partially solidify, in step 236. In some embodiments, at least some of steps 224-236 may be repeated until the entire 3D part (e.g., part 102 illustrated in FIG. 1) is additively casted by pouring a plurality of casted layers. In some embodiments, pouring the liquid substance into the second mold portion may be in an amount sufficient to form the second casted layer and to compensate for at least one of: shrinkage of the first casted layer and thickness deviation in the first casted layer. For example, controller 153 may control pouring unit 120 to pour more liquid substance than the amount required to form the second casted layer, according to the received 3D model. The added liquid substance may be determined as to compensate for deficiencies formed in the first casted layer.

In some embodiments, the first and second casted layers may be joined prior to the pouring of a third casted layer, in step 238. In some embodiments, when casting different casted layers, a thin film may be formed on the free upper surface of each casted layer. When pouring the following layer, the thin film may form a boundary between two adjacent casted layers and may reduce the bonding strength between the layers. Accordingly, in order to increase the bonding strength, an additional joining/bonding operation may be conducted. For example, if the liquid substance is molten metals/alloys the joining may include melting at least a portion of the interface between the first and second casted layers. The melting may be conducted by, for example, heating/treating at least a portion of an upper surface of the second casted layer, such that a temperature higher than the melting point of the casted substance may be formed in the interface between the first and second casted layers. The heating/treating may be with one of: an induction heater, a resistance welder, a laser, a welding arc, a torch, cold fusion, magnetic field flow and the like. In another example, if the liquid substance is molten glass, molten polymer or a polymer resin the joining may include at least one of: gluing, ultrasonic bonding, diffusion bonding, heat curing, UV curing and the like.

In some embodiments, each casted layer may be preheated prior to the pouring of an additional casted layer, in step 240. In some embodiments, the pre-heating is conducted in order to minimize the thermal shocks that may cause macro and micro defects, such as cracks, in the casted layers during the pouring of the additional casted layer. In some embodiments, the previously casted layer may be preheated, for example, to 600-700° C. prior to pouring molten metal or molten glass at 1000-1300° C., thus reducing thermal shock.

In some embodiments, a surface treatment may be provided to each casted layer after the solidification and prior to the pouring of an additional casted layer, in step 242. The surface treatment may include removing an upper film (e.g., a thin oxidized layer) from the casted layer and may also include leveling the mold portion. In such case the removing of the upper film may cause leveling or evening the first casted layer and the first mold portion to be in the same level prior to the deposition of the second mold portion. The leveling may allow more accurate deposition of the second mold portion. In some embodiments, the surface treatment may include at least one of: machining, grinding, polishing and laser ablation.

In some embodiments, pouring the third and fourth casted layers may cause a reheating to some extant an already fully solidified lower casted layer. The reheating may cause an, in situ, annealing process in the first casted layer result in at least partial stress relief of the first casted layer.

In some embodiments, the first casted layer (e.g., layer 104a) may be casted by pouring a first liquid substance having a first chemical composition; and the second casted layer (e.g., layer 104b) may be casted by pouring a second liquid substance having a second chemical composition. In some embodiments, the first liquid substance and the second liquid substance may be selected from: two alloys of the same metallic element, two types of glass (e.g., colored by two different pigments) and two types of polymers, as to ensure the bonding/joining of the first and second casted layers to each other. For example, the first casted layer may include a first type of grey cast iron and the second casted layer may include ductile iron, when cast part 102 may require grater hardness at one part while having ductility and shock absorbing ability in another part.

In some embodiments, in addition to controlling the chemical composition also the microstructure of the first and second casted layers (and any other layer in part 102) may be controlled to be different from each other. For example, by selecting different pre-heating temperature to be provided to the previously poured casted layer, the microstructure may be altered. The lower the selected pre-heating temperature is the finer the microstructure of the poured layer will be. In some embodiments, additives added to the first and second liquid substances may also alter the microstructure. Therefore, the first liquid substance and the second liquid substance may differ in at least one of: the amount and the type of additives that are configured to at least: evaporate and decompose during casting.

In some embodiments, the method of FIG. 2 may further include measuring a chemical composition of the liquid substance in the first container prior to pouring the liquid substance into at least one of: the first mold portion and the second mold portion; and measuring the chemical composition of the corresponding casted layer. For example, one or more sensors 126 may measure the chemical composition of the liquid substance in first container 122 and then measure the chemical composition in the last casted layer. In some embodiments, the sensor may send the measurements to controller 153 and the controller may compare the measurements. In some embodiments, if the measurements yield a difference in chemical composition larger than a threshold value (e.g., due to oxidation of the casted layer) the measured casted layer may be removed, and a new liquid substance may be poured into the at least one of: the first mold portion and the second mold portion. For example, controller 153 may control surface treatment unit 128 to remove (e.g., by milling) an entire casted layer and control movable pouring unit 120 to pour a new casted layer to replace the removed one.

In some embodiments, the method of FIG. 2 may further include removing all the mold portions at the ending of the solidification of the last casted layer. The removing of the mold portions may be conducted according to any known method, for example, by mechanical means or chemical means.

Referring back to FIG. 1 and cast part 102, in some embodiments, cast part 102 may be a metallic part including: at least a first casted layer 104a and at least one second casted layer 104b. In some embodiments, at least a first casted layer 104a may include a first type of alloy and at least a second casted layer 104b may include a second type of alloy. In some embodiments, the first and second alloys may be different alloys of the same metallic element. For example, first casted layer 104a may include aluminum A355 and second casted layer 104a may include aluminum A356. In yet another example, first casted layer 104a may include grey cast iron and second casted layer 104a may include ductile iron. In some embodiments, cast metallic part 102 may include a third casted layer 104 having a third type of alloy of the same metallic element.

In some embodiments, all casted layers 104 may be casted from the same alloy however, at least a first casted layer 104a may include a first predetermined microstructure and at least a second casted layer 104b may include a second predetermined microstructure. There are several methods known in the art for altering the microstructure of various alloys, during the solidification processes. The methods are based on controlling the nucleation process, in which small grain nuclei are formed in the melted metal and then grow into the final grain. There are two main approaches: 1) controlling the over-cooling thus controlling the energetic deriving force for creating the nuclei and 2) adding nucleation centers (e.g., powders that includes compounds that may use as nucleation centers) to the melt prior to pouring the melt into the mold.

In some embodiments, the cooling rate of the casted layer can be controlled by providing different pre-heating temperature to the previously casted layer. For example, cast part 102 may be casted from aluminum A356, however, first casted layer 104a may have larger grain size (e.g., crystal size) than second casted layer 104b. The different grain size may be archived by providing different pre-heating treatment to each layer, as disclosed herein above. In another example, cast part 102 may be casted from grey cast iron, however, first casted layer 104a may have larger graphite flakes than second casted layer 104b. The larger the temperature difference between the molten metal being poured and the substrate (e.g., the former casted layer) the greater is the driving force for creating nuclei, thus the larger is the number of nuclei formed and the finer the final microstructure may be.

In some embodiments, the microstructure may be controlled by the amount of nucleation centers provided to the melt in each layer. For example, $ZrO_2$ particles may be added at two different amounts (e.g., 0.5 wt. % to layer 104a and 1.7 wt. % to layer 104b) to SP steel in order to refine the microstructure. The larger the amount the of $ZrO_2$ particles the larger the amount of nucleation sites and the finer is the microstructure. In some embodiments, at least one first casted layer 104a and at least one second casted layer 104b may differ both in the type of alloy and the microstructure.

In some embodiments, at least a first casted layer 104a and at least a second casted layer 104b may be joined together. For example, the at least a first casted layer 104a and at least a second casted layer 104b may be welded to each other, diffusion bonded to each other and the like as to form a solid metallic part. In some embodiments, the microstructure of the joined areas may be distinguished from the rest of the cast part, a phenomenon known in the art as heat affected zone (HAZ). In some embodiments, if the casted layers have a thickness smaller than the HAZ, then all casted layers may have a HAZ microstructure and the joined areas may not be distinguishable.

In some embodiments, the thickness of each casted layer 104, 104a, 104b may be at least two orders of magnitude smaller than the perimeter of each casted layer.

Figure 5:
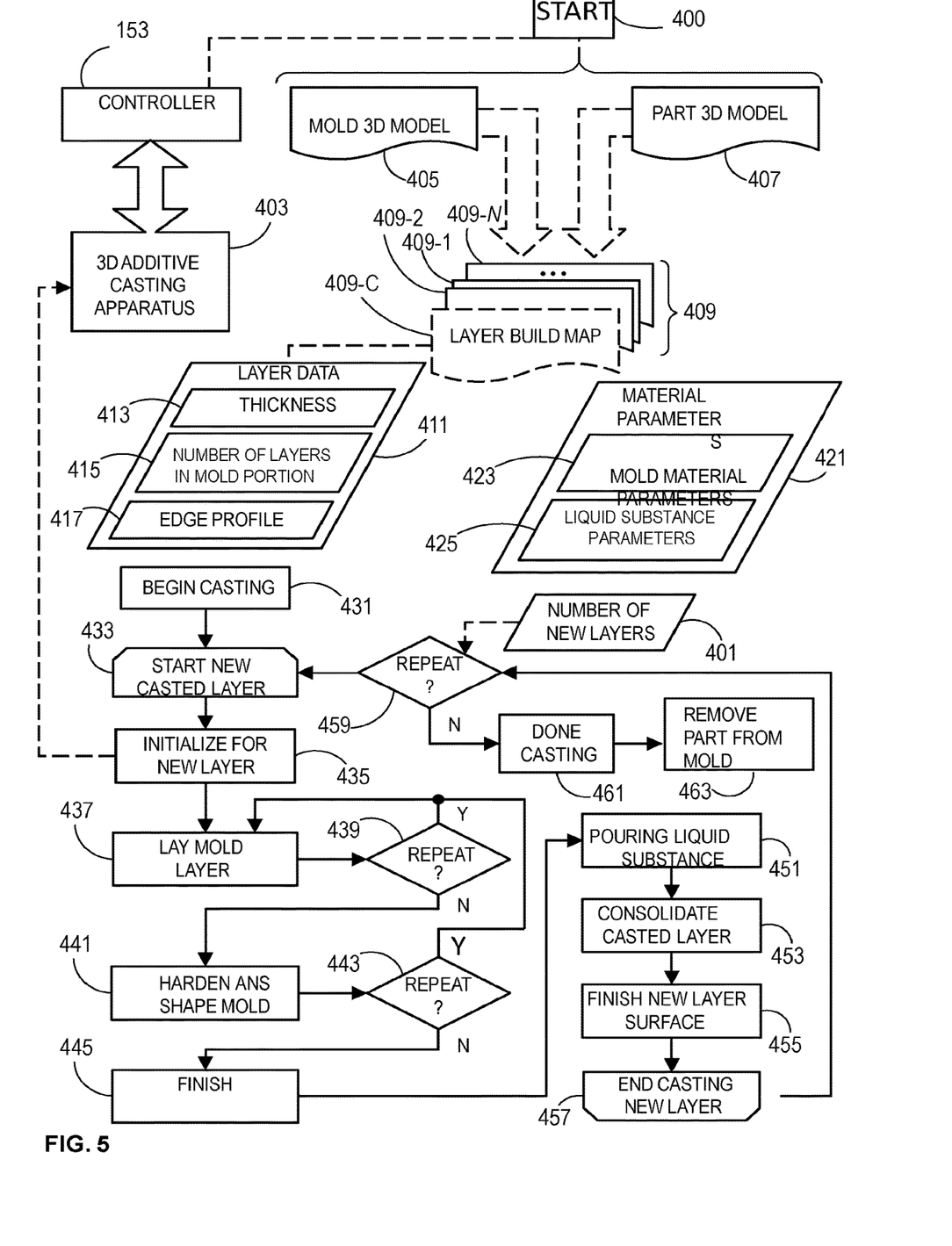
FIG. 5 is a detailed flowchart of a method of additive casting of parts according to some embodiments of the invention.

Reference is now made to FIG. 5 which is a detailed flowchart of a method of additive casting of parts according to some embodiments of the invention. In some embodiments, the method steps may be performed by controller 153 directing an additive casting apparatus 403. In some embodiments, additive casting apparatus (e.g., a 3-D printer) 403 may include at least some of the components of additive casting apparatus 100, illustrated in FIG. 1.

In some embodiments, the process may start at step 400, when a 3D mold model 405 and a 3D part model 407 may be stored in storage 157 of controller 153. In some embodiments, 3D mold model 405 and a 3D part model 407 may be divided to a plurality of mold portions and a corresponding plurality of casted layers to be included in a layer build map set 409. For example, for illustrative purposes as including casted layer and the corresponding mold portions build maps 409-1, 409-2, . . . , 409-N, for a 3D printed part that is poured using N layers. For purposes of illustration and discussion, a typical casted layer and mold portion build map 409-C may include casted layer and mold portion data 411, that may contain a layer/portion thickness parameter 413, a number of mold layers 415 within each mold portion, and edge profile data 417. In the discussions of layer fabrication, build map 409-C may be taken as the "current" layer build map during the 3D additive casting process.

Figure 4:
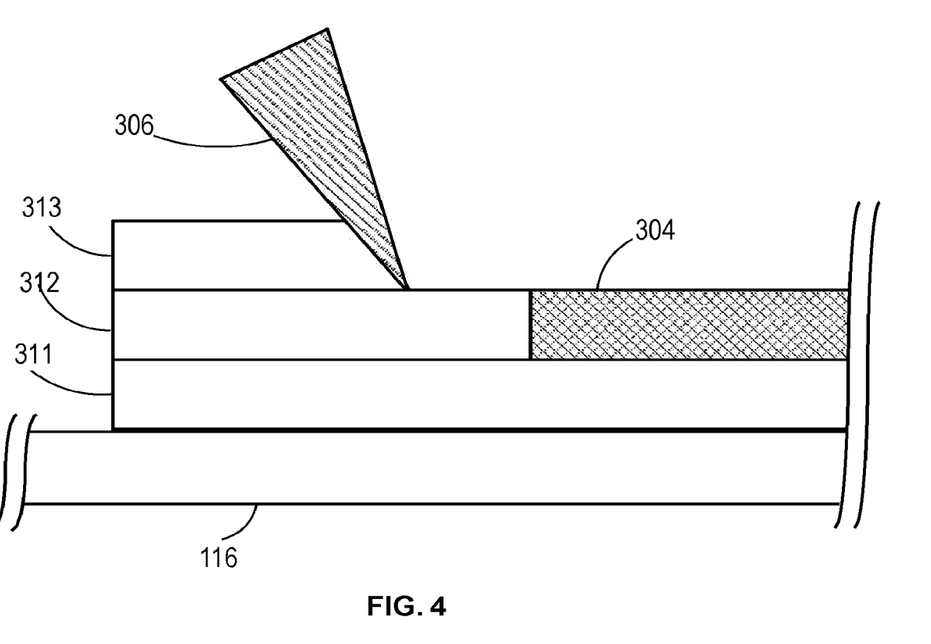
FIG. 4 is an illustration of an in processes casted part and mold according to some embodiments of the invention.

In some embodiments, edge profile data 417 may specify, for example, the shape and angle of the mold walls such as illustrated in FIG. 3A and FIG. 4. In some embodiments, edge profile data 417 may also contain information regarding the sequencing of surface finishing operations, such as illustrated and discussed in FIG. 3B, such that two mold portions (e.g., mold portion 213 and mold portion 215) may be finished simultaneously by end mill 206 (as opposed to finishing portion 213 before depositing portions 215).

In some embodiments, an additional data stored in readable memory accessible to controller 153 may include material parameters 421, for example, the mold material parameters 423 and the liquid substance parameters 425. Material parameters may include specifications and characteristics of the materials, including at least one of: physical properties, chemical compositions and other data necessary to carry out method steps. In a non-limiting example, for a mold material that may be heated to be hardened, mold material parameters 423 may include the temperature and time for hardening. In some embodiments, if the temperature and time derived from the thickness of the mold walls, then mold material parameters 423 may include a formula or lookup table from which the parameters could be derived from the thickness.

Additive casting of a 3D part (e.g., part 102) may begin at step 431, and may be followed by the deposition of mold layer to form the first mold portion (e.g., portion 112), at deposition loop 433. The deposition of a new mold portion may be initialized in an initialization step 435. Initialization steps may include, for example, a selection of the appropriate mold portion form build map set 409. For example, the first mold portion may be deposited according to layer build map 409-1, the second mold portion may be deposited according to build map 409-2, and so forth, up to the casting of the final casted layer/mold portion, according to build map 409-N (for N layers). In a non-limiting example, build table 116 may be initialized in position for the mold portion to be properly deposited and/or the liquid substance be properly poured.

In some embodiments, the mold portion may be deposited, in step 437. For example, mold material may be laid layer by layer (e.g., from movable dispensing unit 130) according to the mold 3D model 405 data in the current build map 409-C (e.g., the current layer in the build map in effect), such that the mold material delineates a region where liquid substance is to be subsequently poured into (e.g., from movable pouring unit 120). In some embodiments, the mold material may be deposited by movable dispensing unit 130, positioned and moved by robotic arm 151, as directed by controller 153.

In some embodiments, at step 439, it may be determined whether a further mold layers should be laid on top of the former mold layer already laid in deposition step 437. The deposition of an additional mold layer at this point may be determined according to the 3D model of the mold portion included in build map 409-C. If a further mold layer is to be deposited, then deposition step 437 may be repeated, as many times as required by build map 409-C in order to complete the corresponding mold portion.

In some embodiments, when no further mold layer is to be deposited after mold deposition step 437, the method may include a mold hardening step 441, to harden all the layers of the mold portion that have been deposited. In some embodiments, the hardening step may be selected according to the mold material parameters. Some mold materials may not require hardening at all. Hardening may be accomplished by any method known in the art, such as UV curing, heating and the like. In some embodiments, the mold material may spontaneously harden over a period of time. Thus, according to this embodiment mold hardening step 441 may include waiting an appropriate amount of time after the deposition of the mold material. Moreover, according to this embodiment, the waiting time may be included in mold material parameters 423, such as by a value, a table, and/or a formula.

In some embodiments, in step 443, it is determined whether a further mold layers may be laid on top of the mold material already deposited in deposition step 437 and optionally hardened in mold hardening step 441. The deposition of further mold layer/portions at this point may be determined based on build map 409-C. If a further mold layer is to be deposited, then deposition step 437 may be repeated to form the mold portion.

In some embodiments, if no further mold layers are to be deposited, then a mold surface finishing step 445 may be performed. In some embodiments, the surface of the walls of the hardened mold may be machined, grinded and/or polished. Mold surface finishing may include surface treatment of either the top surface of the walls of mold portion, or the inner surface of the mold portion, which delineates the part surface to be subsequently formed. Mold surface finishing may be accomplished by one or more of the means previously described herein.

In some embodiments, in pouring step 451, liquid substance may be poured according to the 3D part model 407 data of current layer build map 409-C. In some embodiments, the amount of liquid substance to be poured may be determined such that, the liquid substance fills the region delineated by the mold portion. In some embodiments, liquid substance may be poured by movable pouring unit 120, for example, positioned and moved by robotic arm 151 as directed by controller 153.

In some embodiments, the amount of liquid substance poured into the corresponding mold portion may be determined based on liquid substance parameters 425, for example, the amount of expected shrinkage of the liquid substance during the solidification. The amount may include an additional computation according to volumetric factors such as temperature changes, phase changes, and the like, to allow for expansion, shrinkage, density changes, and so forth.

In some embodiments, in solidification step 453, the poured liquid build table may at least partially be solidified into casted layer.

In some embodiments, if there is a previously-consolidated casted layer beneath the present casted layer, the solidification process may bond the present casted layer to the previously-poured casted layer, so that both casted layers may be part of the same solid part. In some embodiments, an additional joining process may be conducted in order to join the two adjacent casted layers, as disclosed herein above.

In some embodiments, in casted layer surface finishing step 455, the top surface of the casted layer may be treated to have a smooth and level surface of a desired thickness in preparation for the next casted layer, if any, such as by steps previously discussed.

In some embodiments, casted layer pouring loop end 457 may be reached, and at a decision may be taken in step 459 by, for example, controller 153 checks if there is a subsequent casted layer to be fabricated. If there is a subsequent casted layer, casted layer pouring loop 433-457 may be repeated, using the next casted layer build map data from build map data set 409.

In some embodiments, if no subsequent casted layer is to be poured, the 3D additive casting may be terminated at a point 461, and all mold portions forming the mold may be removed in removal step 463. In various embodiments of the present invention, the mold removal may be done according to any known method, for example, chemically, by use of a solution that removes the mold without affecting the 3D casted part within the mold. In other embodiments, the mold may be mechanically removed.

In some embodiments, a number of new layers that still need to be poured/deposited may be determined in step 401, given the number of new casted layers 401, a decision may be made in step 459, to repeat steps 433 through 457.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An additive casting apparatus comprising:
a movable dispensing unit in fluid connection with a first container configured to contain a mold material, the dispensing unit comprising one or more liquid introduction ports configured to deposit the mold material;
a movable pouring unit in fluid connection with at least one second container configured to hold a liquid substance that includes a molten metal with additives comprising at least one of carbon or salts, the pouring unit comprising one or more liquid introduction ports configured to pour the liquid substance;
a build table configured to hold the deposited mold material and the poured liquid substance;
at least one chemical composition sensor configured to measure a chemical composition of the liquid substance in the second container and a chemical composition of solid casted layers formed using the liquid substance;
a surface treatment unit configured to remove at least a portion of a casted layer; and
a controller configured to:
control the movable dispensing unit to deposit the mold material to form a first portion of a mold, layer by layer;
control the at least one chemical composition sensor to measure the chemical composition of the liquid substance in the second container;
control the movable pouring unit to pour the liquid substance into the first portion of the mold to form a first casted layer;
solidifying at least a portion of the first casted layer; thereafter
control the at least one chemical composition sensor to measure the chemical composition of the first casted layer;
determine that the chemical composition of the liquid substance in the second container is different from the chemical composition of the first casted layer by greater than a threshold value;
control the surface treatment unit to remove a portion of the first casted layer;
control the movable dispensing unit to deposit a second portion of a mold, layer by layer, on top of the first portion of the mold; and
control the movable pouring unit to pour the liquid substance into the second portion of the mold to form a second casted layer on top of at least a remaining portion of the first casted layer.

2. The additive casting apparatus of claim 1, wherein the at least one chemical composition sensor is based on X-ray or laser.

3. The additive casting apparatus of claim 1 wherein the at least one chemical composition sensor is coupled to the movable pouring unit.

4. The additive casting apparatus of claim 1 wherein the at least one chemical composition sensor is configured to send the chemical composition measurements to the controller, and the controller is configured to compare the chemical composition of the liquid substance in the second container and the chemical composition of the first casted layer.

5. The additive casting apparatus of claim 1 wherein the surface treatment unit is further configured to remove an oxidized layer from an upper surface of the first casted layer;

level an upper surface of the first casted layer, smooth an upper surface of the first mold portion, and smooth inner walls of the first mold portion.

6. The additive casting apparatus of claim 1 wherein the surface treatment unit is further configured to provide a first surface treatment to inner sides of the first mold portion, the first surface treatment including at least one of machining, grinding, or polishing.

7. The additive casting apparatus of claim 6 wherein the surface treatment unit is further configured to provide leveling of the first mold portion and the first casted layer.

8. The additive casting apparatus of claim 1 wherein the movable pouring unit comprises:
 a molten metal system; and
 a holder for holding the molten metal system; and
 one or more heating units moveable about an area of the build table;
 wherein, the movable pouring unit is configured to move while depositing the liquid substance to form a current object layer over a previous object layer, and the one or more heating units are configured for at least one of: a) a pre-heating process including heating at least a portion of a previous object layer prior to the deposition of a material of the current object layer, and b) a post heating process including heating at least a portion of the current object layer, and wherein a consecutive mold portion is constructed after the deposition of the current object layer is complete.

9. The additive casting apparatus of claim 8, wherein the pre-heating process comprises melting at least a portion of the previous object layer.

10. The additive casting apparatus of claim 8, wherein the post heating process comprises melting at least a portion of the current object layer.

11. The additive casting apparatus of claim 8, wherein the controller is further configured to control the one or more heating units to perform the pre-heating and the post heating processes.

12. The additive casting apparatus of claim 8, wherein the controller is configured to control the one or more heating units during the pre-heating process to heat the at least a portion of the previous object layer to a temperature where a temperature gradient is reduced between the current object layer and the previous object layer.

13. The additive casting apparatus of claim 8, wherein the controller is configured to control the one or more heating units in one or both of the pre-heating and the post heating processes to affect solidification parameters of a melt pool constituted by the pre-heating process on at least a portion of the previous object layer prior to the deposition of the current object layer, and the post heating process including heating at least a portion of the current object layer.

14. The additive casting apparatus of claim 8, wherein the controller is configured to control the one or more heating units during the post heating process such that heating at least a portion of the current object layer is at a temperature sufficient to join the at least the heated portion of the current object layer to a corresponding portion of the previous object layer.

15. The additive casting apparatus of claim 8, additionally comprising: a three dimensional (3D) system for providing relative movement between the build table and the movable pouring unit in a direction perpendicular to a build plane defined by the build table, and wherein the relative movement between the build table and the movable pouring unit is provided after the deposition of the current object layer is complete and before constructing a consecutive mold portion.

16. The additive casting apparatus of claim 8, wherein the movable pouring unit comprises a holder heater in communication with the holder, for heating the molten metal in the holder.

17. The additive casting apparatus of claim 8, wherein the one or more heating units comprise one or more of an induction heater, a resistance welder, an ultrasonic welder, plasma deposition unit, E-beam, a laser, a welding arc, a torch, cold fusion and magnetic field flow.

18. The additive casting apparatus of claim 1 wherein the movable dispensing unit is configured to use mold material made of a granular material mixed with binders in a paste form, wherein the granular material may include at least one of: ceramic powders, sand, clay, and any combination thereof.

19. The additive casting apparatus of claim 1 wherein the mold portions receiving the liquid substance are at a state selected from a group consisting of a green state, a fully cured state and a partially sintered state.

20. The additive casting apparatus of claim 1 wherein the movable dispensing unit is configured to form a shape having closed walls to accommodate the liquid substance.

* * * * *